(12) United States Patent
Liang et al.

(10) Patent No.: US 7,791,236 B2
(45) Date of Patent: Sep. 7, 2010

(54) PERMANENT MAGNET MACHINE

(75) Inventors: Feng Liang, Canton, MI (US); Michael W. Degner, Novi, MI (US); Alfredo R. Munoz, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 204 days.

(21) Appl. No.: 11/839,928

(22) Filed: Aug. 16, 2007

(65) Prior Publication Data

US 2009/0045688 A1 Feb. 19, 2009

(51) Int. Cl.
*H02K 21/12* (2006.01)
(52) U.S. Cl. .............................. 310/156.07; 310/156.01
(58) Field of Classification Search ............ 310/156.01, 310/156.07, 156.56, 156.57, 156.83, 156.02
See application file for complete search history.

(56) References Cited

U.S. PATENT DOCUMENTS

| | | | |
|---|---|---|---|
| 4,508,998 | A | 4/1985 | Hahn |
| 4,713,569 | A | 12/1987 | Schwartz |
| 4,769,567 | A | 9/1988 | Kurauchi et al. |
| 5,378,953 | A * | 1/1995 | Uchida et al. ............ 310/156.59 |
| 5,396,137 | A | 3/1995 | Shinto et al. |
| 5,610,464 | A | 3/1997 | Asano et al. |
| 5,886,440 | A | 3/1999 | Hasebe et al. |
| 6,008,559 | A | 12/1999 | Asano et al. |
| 6,127,764 | A | 10/2000 | Torok |
| 6,175,178 | B1 | 1/2001 | Tupper et al. |
| 6,445,100 | B2 | 9/2002 | Tajima et al. |
| 6,803,692 | B2 | 10/2004 | Hattori et al. |
| 6,858,968 | B2 | 2/2005 | Takita et al. |
| 7,102,263 | B2 | 9/2006 | Takano et al. |
| 7,122,930 | B2 * | 10/2006 | Yamagishi et al. ...... 310/156.53 |
| 7,170,209 | B2 | 1/2007 | Araki et al. |
| 7,196,445 | B2 | 3/2007 | Yamaguchi et al. |
| 7,436,096 | B2 * | 10/2008 | Guven et al. ............ 310/156.53 |
| 2002/0074887 | A1 | 6/2002 | Takano et al. |
| 2004/0135454 | A1 | 7/2004 | Takahashi |
| 2005/0200223 | A1 | 9/2005 | Tajima et al. |
| 2007/0052313 | A1 * | 3/2007 | Takahashi et al. ....... 310/156.53 |
| 2007/0210664 | A1 | 9/2007 | Matsunobu et al. |
| 2008/0231135 | A1 * | 9/2008 | Suzuki et al. ........... 310/156.53 |

FOREIGN PATENT DOCUMENTS

| | | |
|---|---|---|
| DE | 596013 C | 4/1934 |
| DE | 69825386 T2 | 8/2005 |
| DE | 60204705 T2 | 5/2006 |

(Continued)

OTHER PUBLICATIONS

Search Report for GB0814451.1 dated Jan. 6, 2009.

(Continued)

*Primary Examiner*—Nguyen N Hanh
(74) *Attorney, Agent, or Firm*—David B. Kelley; Brooks Kushman P.C.

(57) ABSTRACT

A permanent magnet electric machine with optimum motoring efficiency is disclosed. It is adapted for use in a hybrid electric vehicle powertrain. An asymmetric magnetic flux distribution pattern in the rotor of the machine is established to improve operating efficiency of the machine when it is in a motoring mode.

10 Claims, 10 Drawing Sheets

FOREIGN PATENT DOCUMENTS

| | | | |
|---|---|---|---|
| DE | 112006001929 T5 | 5/2008 | |
| EP | 1217713 A2 | 6/2002 | |
| EP | 1763121 A2 | 3/2007 | |
| EP | 1973217 A2 | 9/2008 | |
| GB | 2452592 | 11/2009 | |
| JP | 30033622 | 1/1991 | |
| JP | 2005-184957 | * | 7/2005 |
| JP | 2005312102 | 11/2005 | |

OTHER PUBLICATIONS

German Patent Office, German Patent Office Action for the corresponding German patent application No. 10 2008 032 172.9-32 mailed Sep. 16, 2009.

GB Search Report for Application No. GB0917697.5 dated Feb. 10, 2010.

* cited by examiner

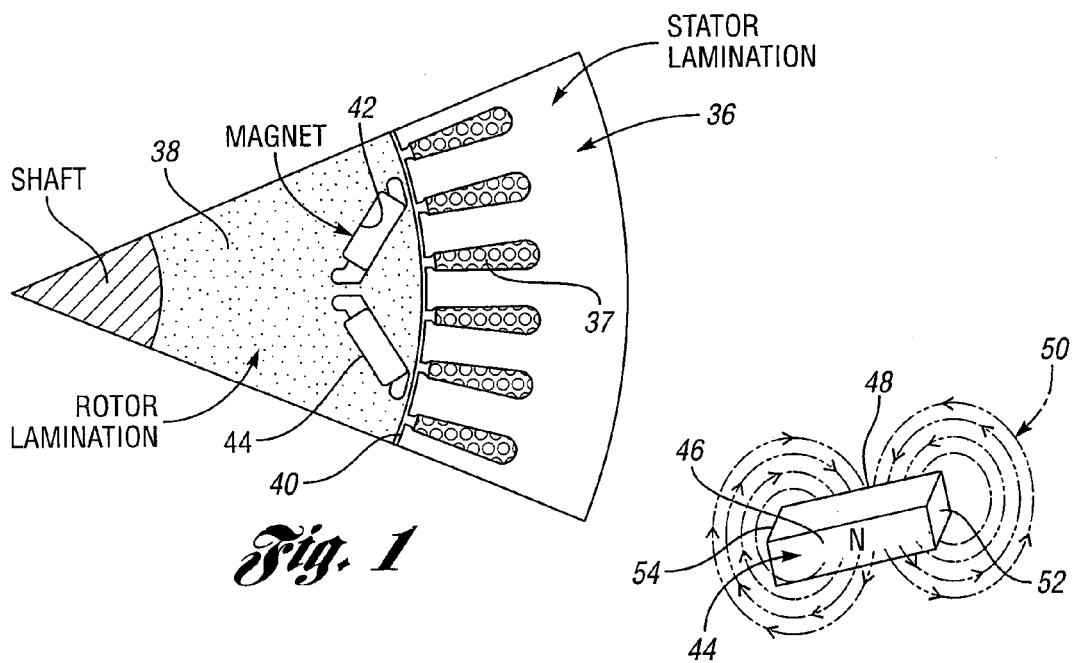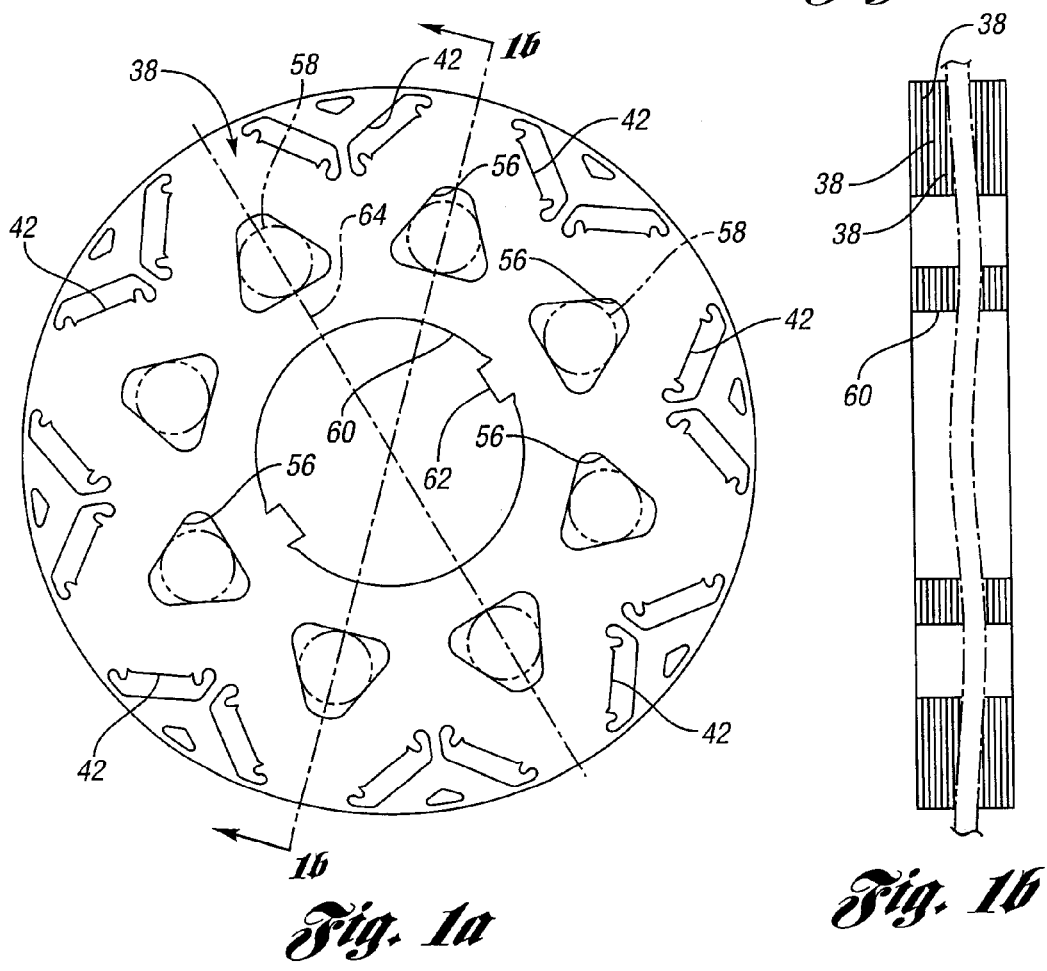

LOAD

GENERATING

PERMANENT MAGNET MACHINE

BACKGROUND OF THE INVENTION

1. Field of the Invention

The invention relates to a permanent magnet machine with an asymmetric rotor design.

2. Background Art

A permanent magnet electric machine typically has a rotor comprising a ferrous metal core and embedded sets of permanent magnets. A stator, which surrounds the rotor, is comprised of a ferrous metal and windings with alternating currents. Such machines, which sometimes are referred to as interior permanent magnet machines, are capable of functioning as a motor or as a generator. The sets of magnets are inserted in holes or cavities in the rotor core.

The weight of the rotor and the moment of inertia of the rotor can be reduced by providing channels in the rotor core. The channels are also used for accommodating cooling oil flow for heat dissipation for some applications. These channels or "oil holes" typically are located symmetrically adjacent rotor magnetic poles for the permanent magnets. The permanent magnet machine will have reduced effective electromagnetic performance for a given stator current if the size of the holes causes a significant reduction in the width of a magnetic flux flow path in a flux-flow region of the rotor. The location of the holes also affects the flux-flow path.

If the permanent magnet machine is used in a hybrid electric vehicle powertrain, weight reduction, thermal management and current capacity of the electric permanent magnet machine are of particular importance and should be taken into account in arbitrating the effects of changes in a flux-flow distribution on overall performance.

In a known permanent magnet machine used in a hybrid electric vehicle powertrain, round oil holes are used, and an electromagnetic flux-flow path is created around the oil holes. The oil holes are positioned symmetrically with respect to embedded permanent magnets.

If oil holes are not included in the rotor design and the permanent magnet machine does not require them for cooling or weight reduction purposes, the magnetic flux in the region below the permanent magnets has a wide path through which the flux pass. Thus, the flux saturation level in that region will be low. Further, the saturation level will be relatively homogenous due to a large cross-sectional area that is available for the flux flow path. When oil holes are introduced in the rotor design, however, the magnetic flux is forced to flow through a path that is much narrower at locations between the magnets and the oil holes. A resulting increase in saturation level that is created requires higher currents to compensate for a electromagnetic torque reduction.

SUMMARY OF THE INVENTION

When a permanent magnet machine incorporating the features of the present invention is a component of a hybrid electric vehicle powertrain, the permanent magnet machine acts as a motor as electric power is delivered from an engine-driven generator and/or from a battery to the motor. The motor converts electrical energy to mechanical energy, which is transmitted to the vehicle traction wheels. When the vehicle is in a braking mode, mechanical energy is distributed from the traction wheels to the permanent magnet machine, which converts the mechanical energy to electrical energy that is stored in the battery during a battery charging mode.

If the vehicle powertrain is a series hybrid vehicle powertrain, in which engine power drives a generator that converts mechanical energy to electrical energy for charging a battery and for driving a permanent magnet machine in a motoring mode, the electrical energy output from the generator that is not used for developing motive power may be used to charge the battery.

If the permanent magnet machine is a part of a divided power hybrid electric vehicle powertrain, mechanical energy from the engine is divided, with a part of the mechanical energy being delivered directly to the traction wheels. The balance of the engine mechanical energy may be used to drive a generator. The generator supplies electrical energy to a battery and to the permanent magnet machine acting as a motor, which in turn converts that electrical energy to mechanical energy to drive the traction wheels, thereby supplementing the mechanical energy from the engine. During operation of the permanent magnet machine in a generating mode as the vehicle is braking, however, only a part of the vehicle kinetic energy is dissipated through mechanical brakes and engine braking and the balance is converted to electric energy by the permanent magnetic machine acting as a generator.

Because of this operating characteristic of hybrid electric vehicle powertrains, a permanent magnet machine embodying features of the present invention is adapted for use in both a divided power hybrid electric vehicle powertrain and a series hybrid electric vehicle powertrain. An asymmetric disposition of elements of a rotor having the features of the invention will result in an improvement in the electromagnetic performance of the permanent magnet machine during motoring although its electromagnetic performance may be degraded during operation in the generating mode. But, since the permanent magnet machine operates in a motoring mode during a larger percentage of its total operating time, improved performance of the permanent magnet machine during motoring is far more significant to its overall performance than the degradation in performance during its operation in a generating mode.

When the permanent magnet machine is operating under a no-load condition, the magnetic flux distribution in the rotor is symmetric with respect to the magnets and the magnetic flux lines are evenly distributed around the oil holes. Under loaded conditions, however, the permanent magnet magnetic flux distribution interacts with the flux distribution produced by stator currents, and the resultant flux distribution is shifted toward the rotor's rotating direction as the permanent magnetic machine acts as a motor and in the opposite direction as the permanent magnet machine operates as a generator.

Since a motoring operating mode is predominant for a permanent magnet machine in a hybrid electric vehicle powertrain, as explained above, the location and shape of the oil holes can be tailored to optimize the operation of the permanent magnet machine in a motoring mode, thereby improving overall performance. A strategic location, size and shape of the oil holes thus can improve the performance of the motor-generator in the motoring mode, while somewhat degrading performance in the generating mode. The different torque requirements for a motoring mode and a generating mode make it possible to design the rotor with an asymmetric geometry that will take full advantage of the predominant magnetic flux distribution path.

The rotor of a permanent magnet machine having features of the present invention may have a laminated rotor core of magnetic ferrous material. The number of laminations can be varied depending upon the total thickness of the rotor that is desired. A plurality of magnets is embedded in the rotor near an air gap between the stator and the rotor. The oil holes are shaped to allow maximum rotor material removal without significantly reducing motor torque.

In the disclosed embodiments of the invention, the oil holes can be generally triangular rather than round. A strategic location of the oil holes, furthermore, will optimize the flux distribution for improved electromagnetic performance during motoring. The position of the oil holes relative to the magnets is asymmetric. This asymmetry can be achieved by angularly displacing the oil holes relative to axes of symmetry that contain the geometric centers of the oil holes or by displacing the oil holes sideways relative to their axes of symmetry.

According to another embodiment of the invention, an asymmetric rotor design can be achieved by locating the magnets, rather than the oil holes, in an asymmetric fashion so that the position of the oil holes becomes optimum relative to the magnets.

According to yet another embodiment of the invention, asymmetrically positioned extra holes or cavities may be provided in the rotor in proximity to the magnets to increase electromagnetic torque produced by the machine.

BRIEF DESCRIPTION OF THE DRAWINGS

FIG. 1 is a partial radial cross-sectional view of a rotor lamination and a stator lamination embodying features of the invention;

FIG. 1a is a plan view of an embodiment of the rotor of the present invention;

FIG. 1b is a cross-sectional view as seen from the plane of the section line 1b-1b of FIG. 1a;

FIG. 1c is an isometric view of a magnet received in magnet openings formed in the rotor of FIGS. 1a and 1b;

PARTICULAR DESCRIPTION EMBODIMENTS OF THE INVENTION

Figure 2:
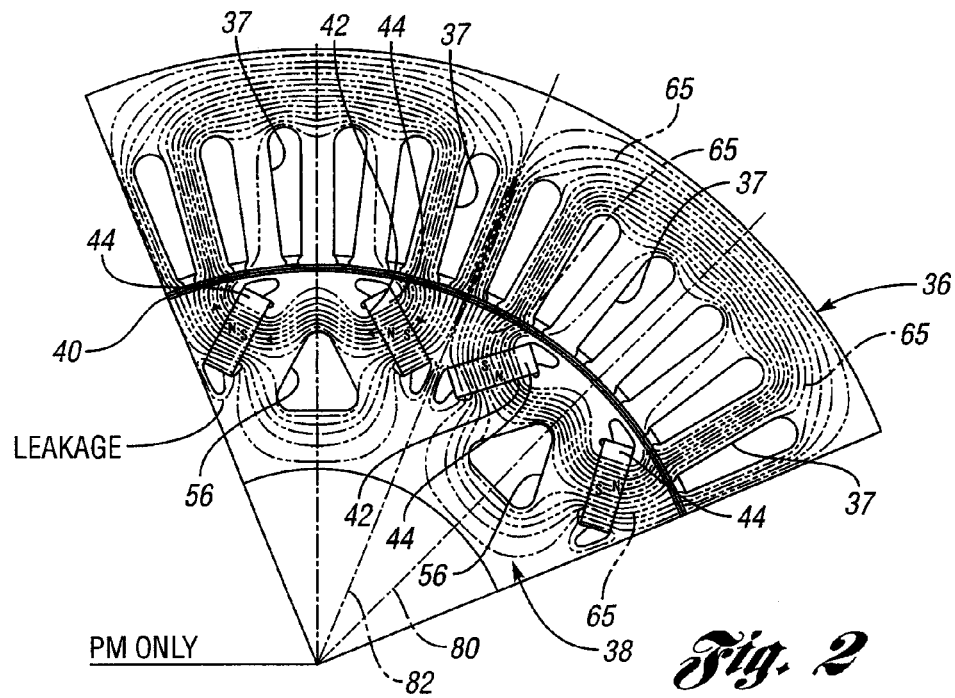
FIG. 2 is a diagrammatic view of a rotor embodying features of the invention, wherein electromagnetic flux lines are indicated and wherein the stator has no current, the magnetic flux lines from the north poles (N) to the south poles (S) being generated by the magnets only.

For the purpose of describing an operating environment for the permanent magnet machine of the invention, reference first will be made to FIGS. 14, 15 and 16, which respectively illustrate a series-parallel hybrid electric vehicle powertrain, a split-power hybrid electric vehicle powertrain and a series hybrid electric vehicle powertrain. In the case of the powertrain schematically illustrated in FIG. 16, an engine 10 is mechanically connected to a generator 12, which in turn is electrically coupled to an electric motor 14. Typically, the electrical coupling includes a DC link comprising an AC/DC converter 16 and a DC/AC converter 16'. A high-voltage traction battery 18 is coupled to the DC link through a DC/DC converter 20. The motor is mechanically coupled to a geared transmission mechanism 22, which may have multiple-ratio gearing or a single-ratio gearing.

Traction wheels 24 are driven by torque output elements of the transmission mechanism. All of the mechanical energy of the engine, except for power losses, is transferred to the generator, which converts mechanical energy to electrical energy for driving the motor 14. Any electrical energy not required to drive the motor is used to charge the battery 18. When the vehicle is braking, all or part of the vehicle mechanical kinetic energy transferred from the transmission to the motor 14, except for losses, is used to charge the battery as the motor 14 acts as a generator.

Figure 14:
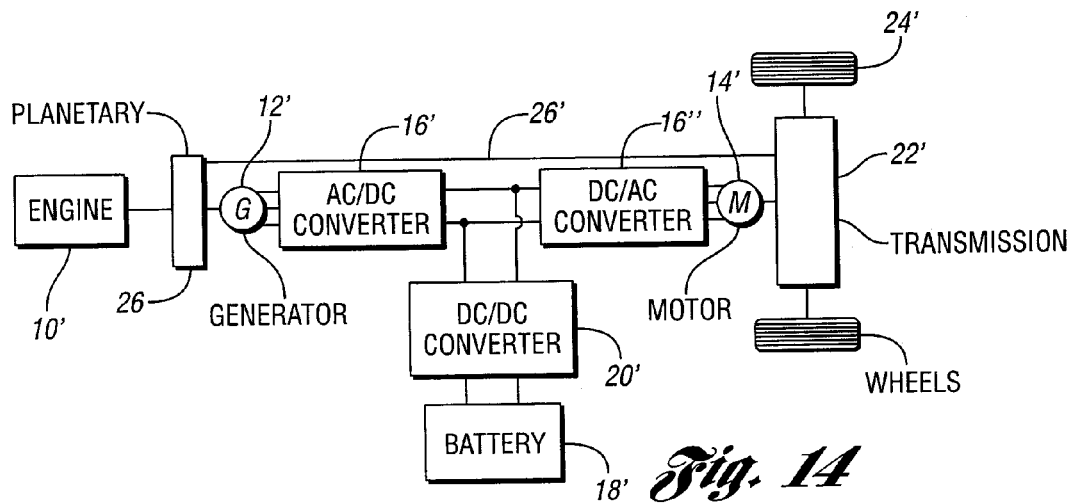
FIG. 14 is a schematic block diagram of a hybrid electric vehicle powertrain in which the powertrain elements are in a series-parallel configuration.
Figure 15:
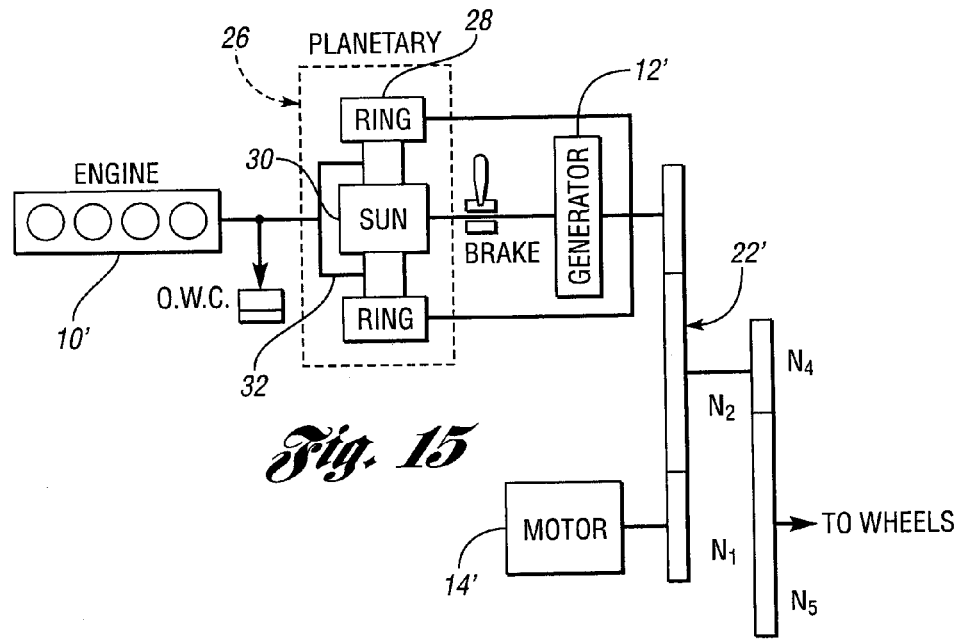
FIG. 15 is a schematic diagram of a series-parallel hybrid electric vehicle powertrain, wherein powertrain torque split planetary gearing is illustrated, a portion of the engine torque being used to drive a generator and the balance of the engine torque is transmitted mechanically to the traction wheels.
Figure 16:
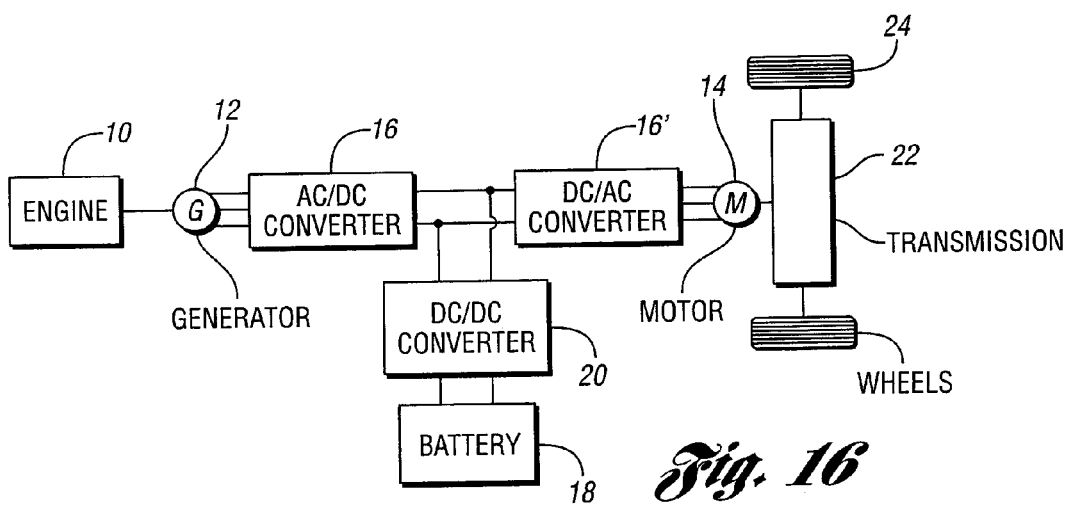
FIG. 16 is a schematic block diagram of a hybrid electric vehicle powertrain wherein the elements of the powertrain are in a series configuration.

In contrast to the series arrangement of FIG. 16, the series-parallel arrangement of FIG. 14 includes a direct mechanical connection between the engine and the transmission, as shown at 26'. The series-parallel hybrid powertrain of FIG. 14 and the split-power hybrid powertrain of FIG. 15 have components that are counterparts for components in the series arrangement of FIG. 16. They have been indicated by common reference numerals, although prime notations are added to the numerals in FIGS. 14 and 15.

The mechanical connection between the transmission 22' and the engine 10' includes a planetary gear system 26. The planetary gear system, seen in FIG. 15, includes a ring gear 28, which acts as a power output member for driving a power input element of the transmission mechanism 22'. A sun gear 30 is mechanically connected to generator 12'. The carrier for the planetary gear unit 26, shown at 32, is connected to the power output shaft or crankshaft of the engine 10'. As the engine delivers torque through the planetary to the transmission, the sun gear acts as a reaction element since it is mechanically connected to the generator. The load on the generator thus will determine the speed of the engine. During forward drive, torque of motor 14' complements engine torque and provides a second power input to the transmission. During reverse drive, the torque direction of the motor 14' is changed so that it will operate in a reverse direction. The engine is inactive at this time.

When the vehicle is in a braking mode, regenerative energy is delivered from the wheels through the transmission to the motor. The motor at this time acts as a generator to charge the battery. A portion of the regenerative energy is distributed through the transmission to the engine through a mechanical torque flow path, shown in part at 26' in FIG. 14. In this respect, the regenerative energy flow path of the powertrain of FIG. 14 differs from the energy flow path for the powertrain of FIG. 16 where no mechanical energy during regenerative braking is distributed to the engine.

Figure 11:
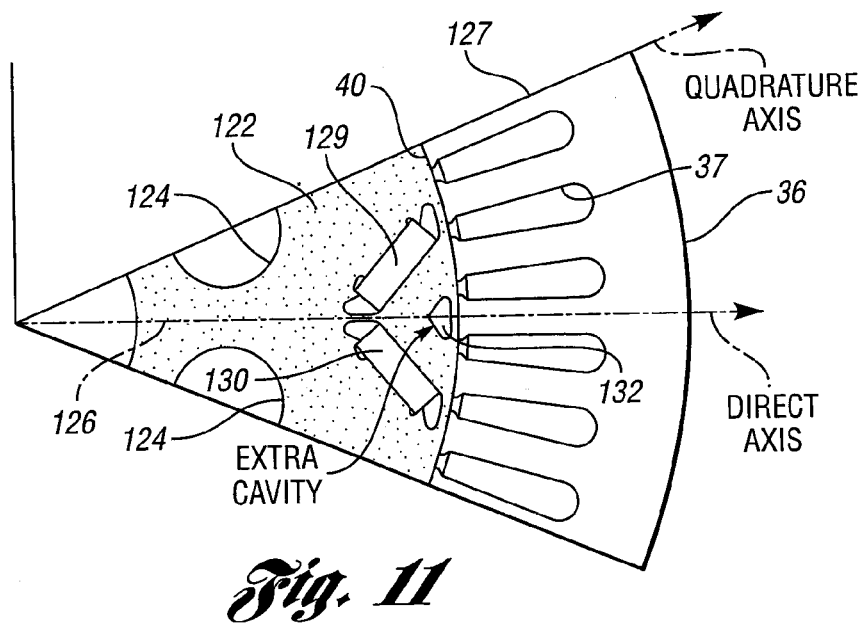
FIG. 11 is a partial radial cross-sectional view of a rotor of another embodiment of the invention wherein the rotor has extra cavities located generally on direct axes between adjacent pairs of magnets.

In view of the fact that the motor 14' of the parallel hybrid powertrain of FIG. 11 recovers only a portion of the regenerative energy, efficiency of the motor during its motoring mode is more significant than its efficiency during a generating mode. A series-parallel hybrid electric powertrain of the type illustrated in FIG. 14, as previously mentioned, thus is particularly adapted to incorporate a motor having the features of the present invention. The same is true for the split-power hybrid powertrain of FIG. 15.

As will be explained subsequently, an improvement in overall powertrain efficiency when the powertrain includes a motor having the features of the invention results in an improvement in the motoring efficiency of the motor 14' as the generating efficiency of the motor 14 is somewhat degraded.

The rotor and the stator for the disclosed embodiments of the invention are comprised of ferrous laminations. A rotor and stator construction of this type is shown in the partial radial cross-sectional views of FIGS. 1, 1a and 1b. A stator lamination is shown at 36 and a rotor lamination is shown at 38. A small air gap 40, seen in FIGS. 2-6, is located between the inner periphery of the stator laminations 36 and the outer periphery of the rotor laminations 38. Radially extending openings 37 are formed in the stator laminations and symmetrically positioned magnet openings 42 are formed near the outer periphery of each rotor lamination 38. Each magnet opening receives a magnet 44.

FIG. 1c is an isometric view of one of the magnets. Each magnet is of generally rectangular in cross-section. One end of the magnet is a north pole, as shown at 46, and the opposite end is a south pole 48. Magnetic flux-flow lines extending from the north pole to the south pole are shown at 50.

FIG. 1a and FIG. 1b illustrate a rotor construction with multiple laminations arranged in stacked relationship. The magnet openings are shown in FIG. 1a, but this figure omits an illustration of the magnets. The oil hole openings are shown in FIG. 1b. Typically, the axial thickness of the rotor of FIGS. 1a and 1b would be greater than the distance between the end faces of the magnets 44. Therefore, a plurality of magnets would be placed end-to-end in the magnet openings 42 with the end 52 of one magnet abutting the end 54 of the adjacent magnet.

The rotor laminations 38 are provided with openings 56, which are generally of triangular shape. The corners of the openings may be rounded, as shown in FIG. 1a. These openings accommodate flow of cooling oil through the rotor. They also reduce the mass of the rotor. The reduced weight will reduce the rotary inertia of the rotor. The triangular shape of the openings to make it possible to eliminate rotating mass of the rotor to an extent that is greater than a mass reduction that would occur if the openings were round. For the purpose of comparing the increased size of the openings with the diameter of round openings at the same locations, round openings have been illustrated in phantom in FIG. 1a by dotted lines at 58.

The center of the rotor laminations has a circular central opening 60 for accommodating a driveshaft with a keyway that may receive drive keys 62.

The openings 56 are symmetrically disposed with respect to adjacent pairs of magnet openings 42, one of the axes of symmetry being shown at 64.

FIG. 2 is a partial view of a rotor lamination 38. The stator 36 has stator windings in the openings 37, but they are not illustrated in FIG. 2 because it is assumed that in the case of FIG. 2, the stator windings do not carry electrical current. The stator windings with current, however, will be described subsequently with reference to FIG. 2a.

Each opening 56 in FIG. 2 is disposed between adjacent magnets 44 in a symmetric relationship with respect to the magnets 44. Flux flow lines between each pair of magnets 44 are shown at 65. The flux flow lines emanate from a north pole of a first magnet and pass through the air gap 40 to the stator 36. The flux-flow lines travel radially outward through stator metal between openings 37 and then travel in a circumferential direction before returning in a radially inward direction. The flux-flow lines passing through the stator again cross the air gap 40 and return to the south pole of an adjacent second magnet 44. A second portion of the flux-flow path will emanate from the north pole of the second magnet and pass through the rotor lamination 38 to the south pole of the first magnet. Flux-flow lines also envelop the openings 56, as indicated in FIG. 2.

Figure 2A:
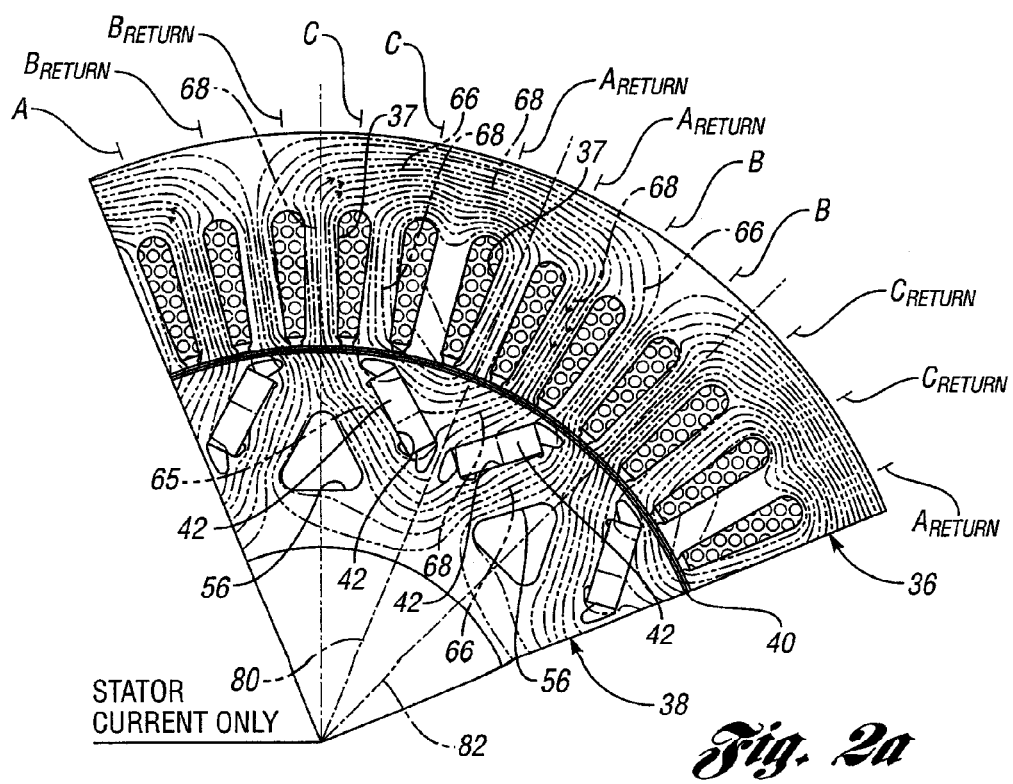
FIG. 2a is a view similar to the view of FIG. 2, wherein the stator has energized windings with electrical current, but wherein the magnets are not included, the flux lines being generated solely by the stator windings.

FIG. 2a is an illustration of the flux-flow distribution created by the stator 36 when the magnets have been removed from the magnet openings 42. In the case of FIG. 2a, the stator windings are energized to create a flux-flow distribution 66. The pattern 66 defines a flux-flow path 68 extending radially outward through the stator. The flux-flow path turns in a circumferential direction near the outer periphery of the stator. The flux-flow path then returns in a radially inward direction through the stator and traverses the air gap 40. It then enters the outer peripheral portion of the rotor adjacent the openings 42 for magnets 44. The flux-flow path then extends again in a radially outward direction through the air gap 40 toward the radially outward region of the stator. As seen in FIG. 2a, the flux-flow distribution created by the stator windings also envelops the openings 42 for magnets 44.

The flux-flow path 68 is created by windings in stator openings 37 at positions A, positions B, and positions C. The windings in the stator openings are indicated in cross-sectional form in FIG. 2a. Stator windings extend through stator openings at locations A and then return through openings at locations $A_{return}$. Stator windings extend in one direction through openings at locations B and return in the opposite direction through openings at locations $B_{return}$. The windings at openings at locations C extend in one direction and return in the opposite direction through openings at locations $C_{return}$.

FIG. 2a shows only one segment of the stator windings. The pattern created by the windings illustrated in FIG. 2a are repeated at the other segments, not shown.

Figure 3:
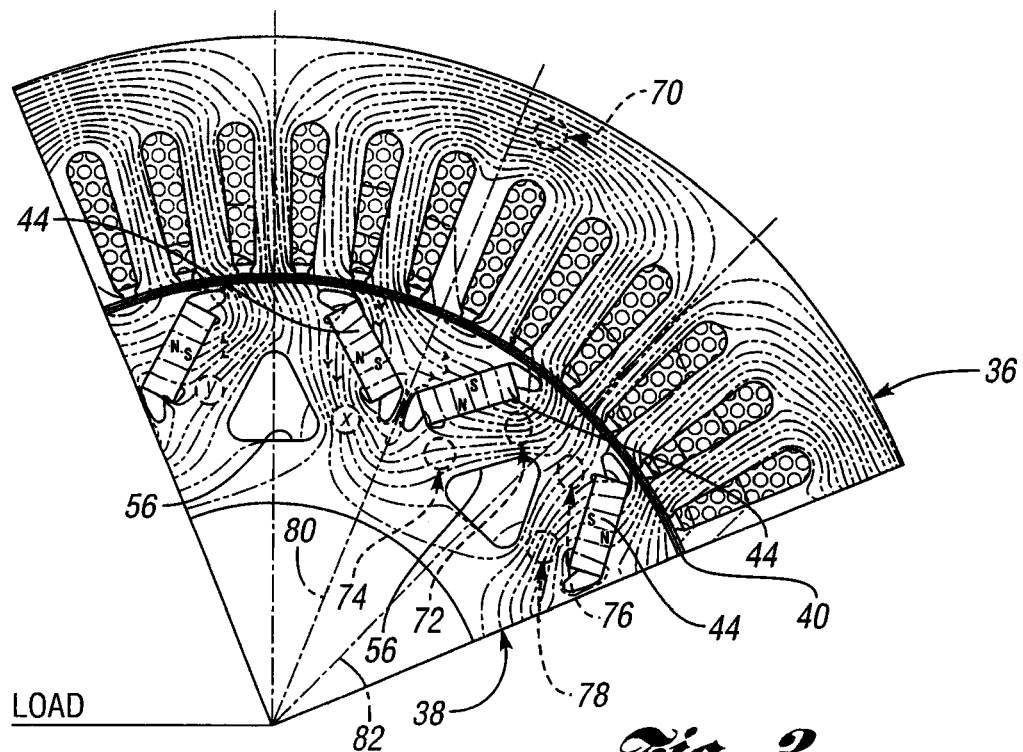
FIG. 3 is a view similar to FIGS. 2 and 2a but which includes a flux distribution developed by the combined effect of magnets and the stator winding currents when the permanent magnet machine is operating under load in a motoring mode.

FIG. 3 shows the flux-flow distribution when the stator windings are energized and when the magnets are installed in the rotor. In this instance, the permanent magnet machine is in a motoring mode. The flux-flow path between the north poles of the adjacent magnets 44 extends through the rotor and in a radially outward direction through the stator. The flux-flow path then extends circumferentially through the stator material, as shown at region 70. The flux-flow path then returns in a radially inward direction across the air gap 40 to the south poles of the adjacent magnets 44. This flux distribution creates a higher flux density region at 72 and a lower flux density region at 74 as the flux-flow passes through the cross-section defined by the space between the north pole of the adjacent magnet and the adjacent side of an opening 56 per unit rotor length in the axial direction.

The flux-flow path created by the magnets 44 and the stator windings in an adjacent segment has a lower flux density region 76 and a higher flux density region 78 at a location between the south pole of an adjacent magnet 44 and the edge of an opening 56.

Figure 4:
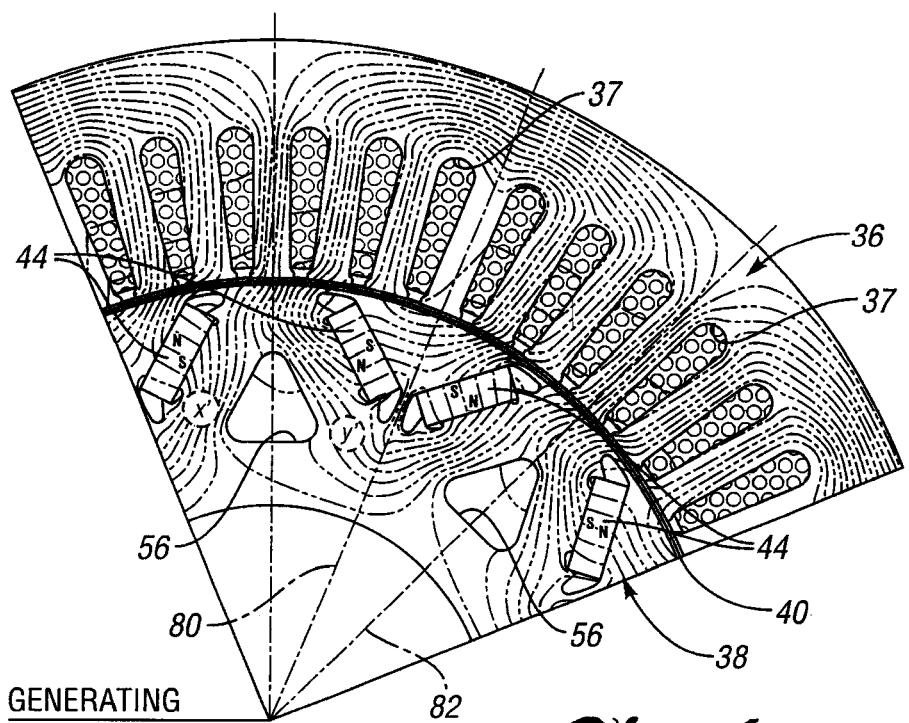
FIG. 4 is a view similar to FIG. 3, with a flux distribution developed by the combined effect of magnets and by the stator winding currents as the permanent magnet machine operates in a generating mode.

Unlike the flux-flow distribution of FIG. 3 for the motoring mode, the flux-flow distribution shown in FIG. 4 is converse with respect to the flux-flow distribution of FIG. 3 during a generating mode. That is, the higher flux density region shown at X in FIG. 3 is replaced by the higher flux density region X shown in FIG. 4 for the generating mode. Also, the lower flux density region Y in FIG. 3 for the motoring mode is replaced by the lower flux density region Y' in FIG. 4 for the generating mode.

It is to be noted that in FIGS. 2-4, the openings 56 are situated symmetrically with respect to the magnets 44. The spacing between each opening 56 and an adjacent magnet 44 are substantially equal. Thus, the flux-flow distribution on one side of the opening will have a high density region and a low density region. The opposite side of each opening 56 also has a high density region and a low density region, but they are located opposite, one with respect to the other. Further, the magnets 44 are symmetrically situated with respect to an axis of symmetry 80. A corresponding axis of symmetry for the openings 56 is shown at 82.

Figure 5:
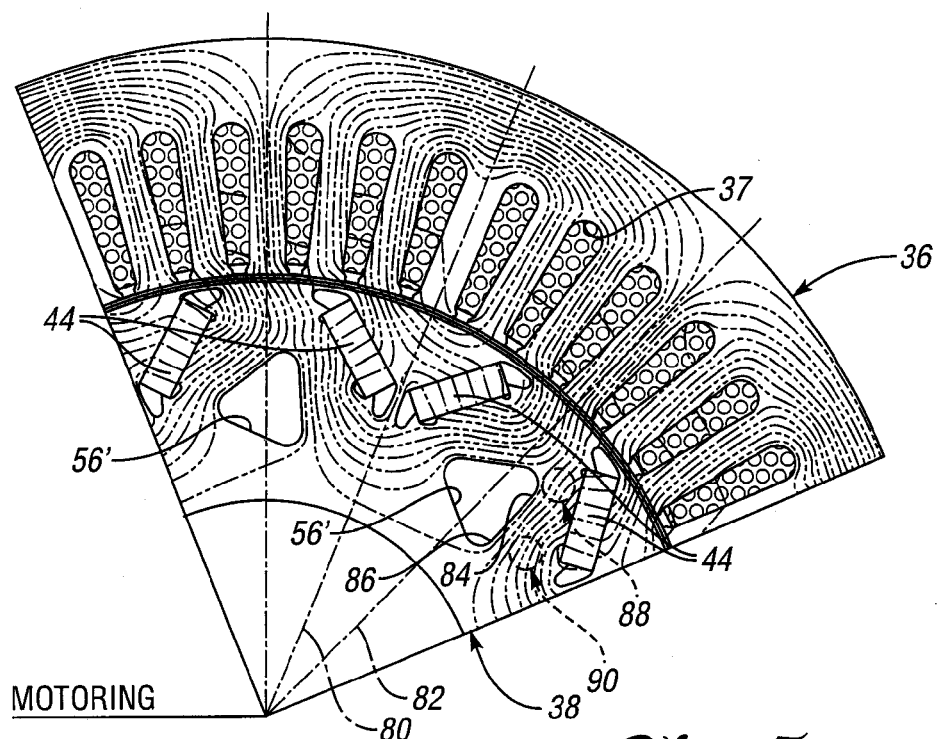
FIG. 5 is a view of the rotor and the stator as seen in FIG. 3, but wherein the oil holes are displaced asymmetrically with respect to adjacent magnets as the permanent magnet machine operates in a motoring mode.

In the case of FIG. 5, the rotor is provided with generally triangular openings 56', which correspond to the openings 56, as shown in FIGS. 2-4. The openings 56' are rotated in a clockwise direction, as viewed in FIG. 5, about the geometric center of the opening. The geometric center of each opening 56' is located on an axis of symmetry 82. Since each opening 56' is rotated, as shown in FIG. 5, the spacing between the adjacent magnets 44 and the point 84 on the edge of the opening 56' is reduced relative to the corresponding spacing illustrated in FIGS. 2-4. Further, the spacing between the adjacent magnets 44 and point 86 on the edge of opening 56' is increased relative to the corresponding spacing illustrated in FIGS. 2-4. This increases the magnetic saturation level in region 88 and reduces the magnetic saturation level in region 90 when the permanent magnet machine is in a motoring mode.

Figure 6:
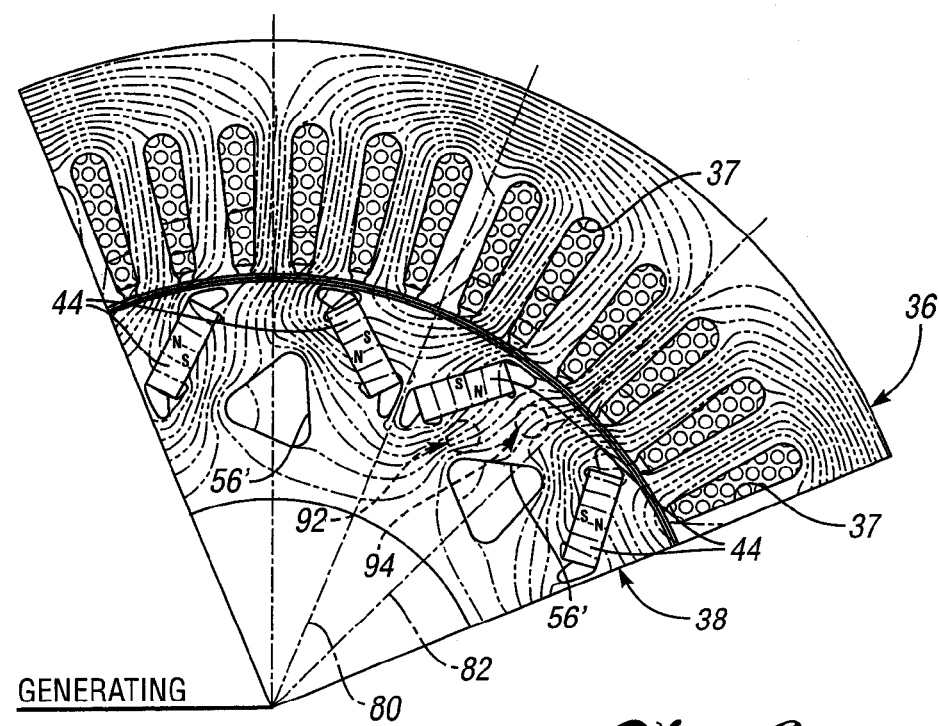
FIG. 6 is a view similar to FIG. 5, wherein the permanent magnet machine operates in a generating mode.

FIG. 6 is a view similar to FIG. 5, but the permanent magnet machine is shown operating in a generating mode, rather than a motoring mode. In the case of FIG. 6, the flux density distribution in region 92 becomes more dense, and the flux density distribution in region 94 becomes less dense, compared to the flux density distribution of FIG. 4.

The change in the flux density distribution described in the preceding discussion is similar to the other flux distributions for each pair of magnets and for the stator windings with which that pair of magnets interacts. In the embodiments herein described, each pair of magnets interacts with the windings in the adjacent stator openings.

The permanent magnet machine designs herein disclosed are synchronous motor designs in which the stator windings may be excited by a three-phase alternating current. Thus, the flux-flow lines illustrated in FIGS. 2-6 demonstrate the flux density distribution at a given instant in an alternating current cycle for the stator winding current.

Figure 7:
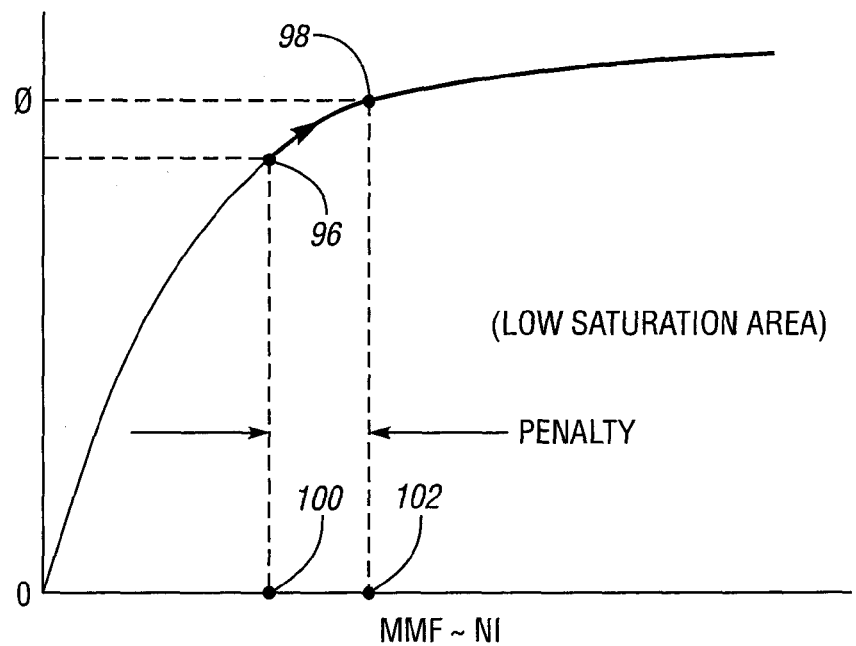
FIG. 7 is a plot of the relationship between magnetomotive force (MMF) and flux density for a flux distribution at a low saturation area.

FIG. 7 is a plot of magnetic flux density versus magnetomotive force (MMF) for a low flux saturation area. The magnetomotive force is proportional to the number of turns in the stator windings times the stator winding current. An increase in flux density occurs rapidly as the stator current increases from a zero value to a point 96 in a low saturation region. The slope of the plot of FIG. 7 decreases rapidly between point 96 and a higher value of flux density at point 98. The change in the density of the flux between point 96 and point 98 corresponds to an increase in stator current from a value shown at 100 to a value shown at 102.

Figure 7A:
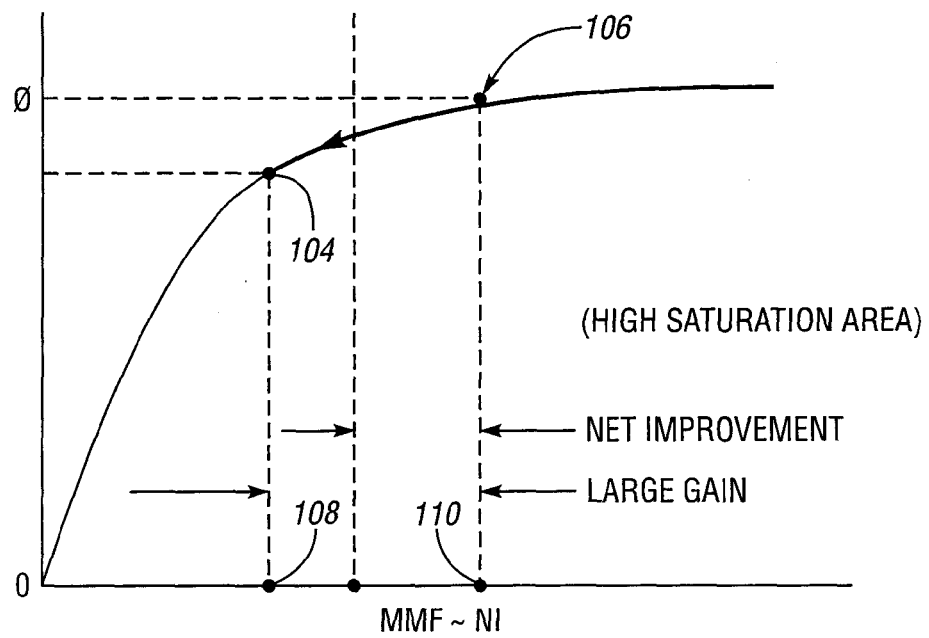
FIG. 7a is a plot of flux density versus magnetomotive force for the flux distribution at a high saturation area.

In contrast to the plot of FIG. 7, the plot of FIG. 7a shows the relationship between flux density and stator current in a high flux density region. As in the case of FIG. 7, the flux density plot of FIG. 7a will increase with a high slope from a value of zero to the value shown at 104. The slope of the plot of FIG. 7a decreases substantially at higher stator currents. For a given change in flux density corresponding to the flux density change of FIG. 7, the stator current will decrease from a relatively high value, as shown at 106 to a lower value at 104. It is because of the characteristics shown in FIGS. 7 and 7a that the strategic shape and asymmetric locations of the oil holes, as shown in FIGS. 5 and 6, will result in improved overall efficiency of the permanent magnet machine during operation in the motoring mode, although efficiency will be degraded somewhat during operation in the generating mode. That is because the flux density is reduced in the high flux density region while operating in the motoring mode, and the change in flux density is increased in the high flux density region during operation in the generating mode when the locations of the oil holes are asymmetric.

Referring to FIGS. 7 and 7a, a change in flux density from point 96 to point 98 will result in a change in current from point 100 to point 102. For the same change in flux density in a high saturation region, as shown in FIG. 7a, the change in current will be much greater. A change in current due to movement of the operating point from point 96 to point 98 due to asymmetry of the design will be relatively small compared to the change in current as the operating point moves from point 106 to point 104, as seen in FIG. 7a.

There is a relatively large decrease in current demonstrated in FIG. 7a as the saturation level decreases from point 106 to point 104. This change is larger than the penalty that results as the current increases from point 100 to point 102, indicated in FIG. 7. This increase in current shown in FIG. 7 represents a penalty, but that penalty is much less than the gain indicated in FIG. 7a. The overall net efficiency improvement of the powertrain thus is increased when the permanent magnet machine is operating in the motoring mode. As previously explained, operation in the motoring mode occurs during a major portion of a hybrid powertrain operating time.

Figure 8:
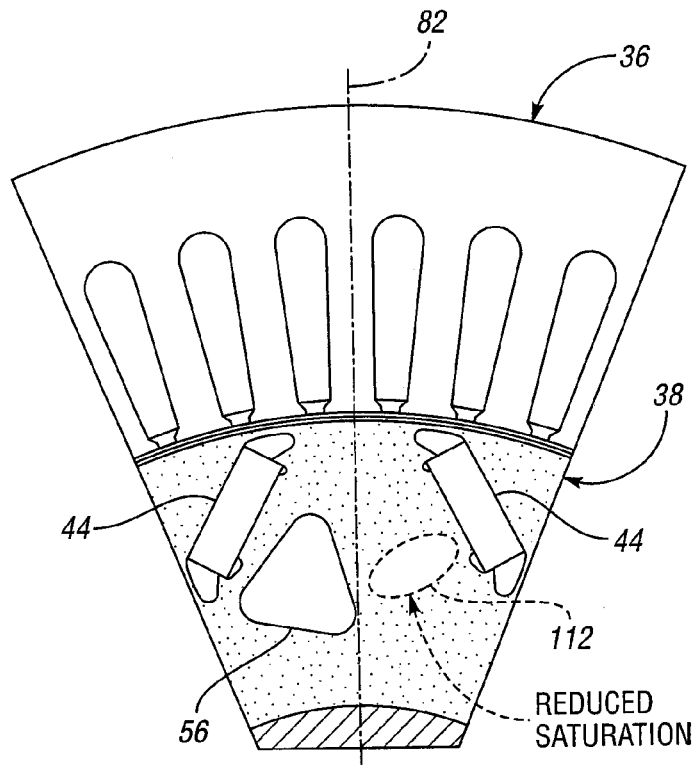
FIG. 8 is a cross-sectional view similar to the cross-sectional views of FIGS. 5 and 6, but where the oil holes are rotated with respect to their geometric center and displaced to one side of a line of symmetry for adjacent magnets, unlike the oil hole placement shown in FIGS. 5 and 6 where the oil holes have a center of rotation located on the axis of symmetry.
Figure 9:
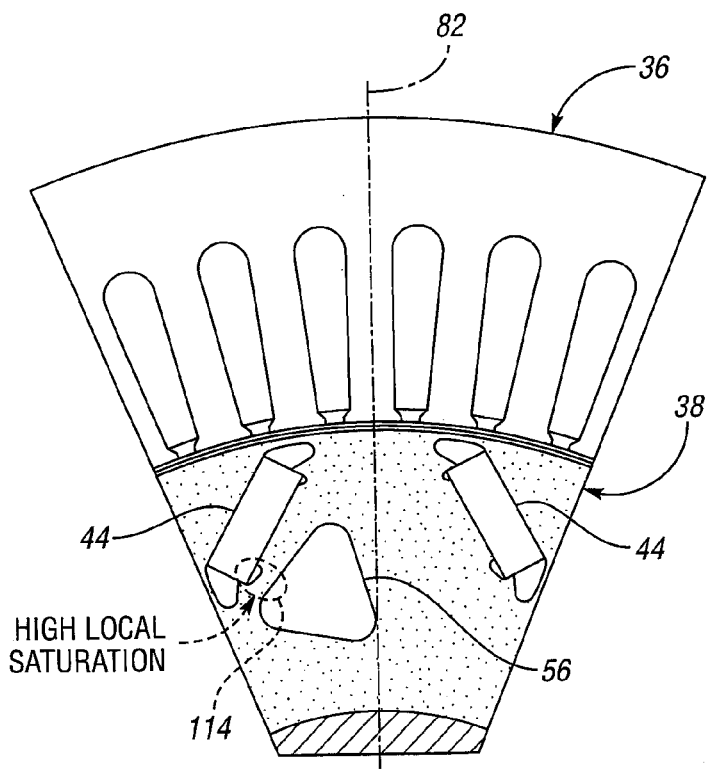
FIG. 9 is a cross-sectional view similar to FIG. 8, wherein the machine is operating in the generating mode rather than the motoring mode under loaded conditions, as seen in FIG. 8.

FIGS. 8 and 9 show an alternate embodiment of the invention, wherein asymmetry of the design can be achieved by displacing the oil holes to one side of the axis of symmetry 82. When the permanent magnet machine of FIG. 9 is operating in a generating mode, the flux density distribution that occurs due to the asymmetric location of the oil holes 56 will result in a local high saturation area 114 when the rotor structure is optimized for the motoring mode, but is actually operating in the generating mode. When it operates in the motoring mode under loaded conditions as shown in FIG. 8, a reduced saturation area occurs at 112.

Figure 10:
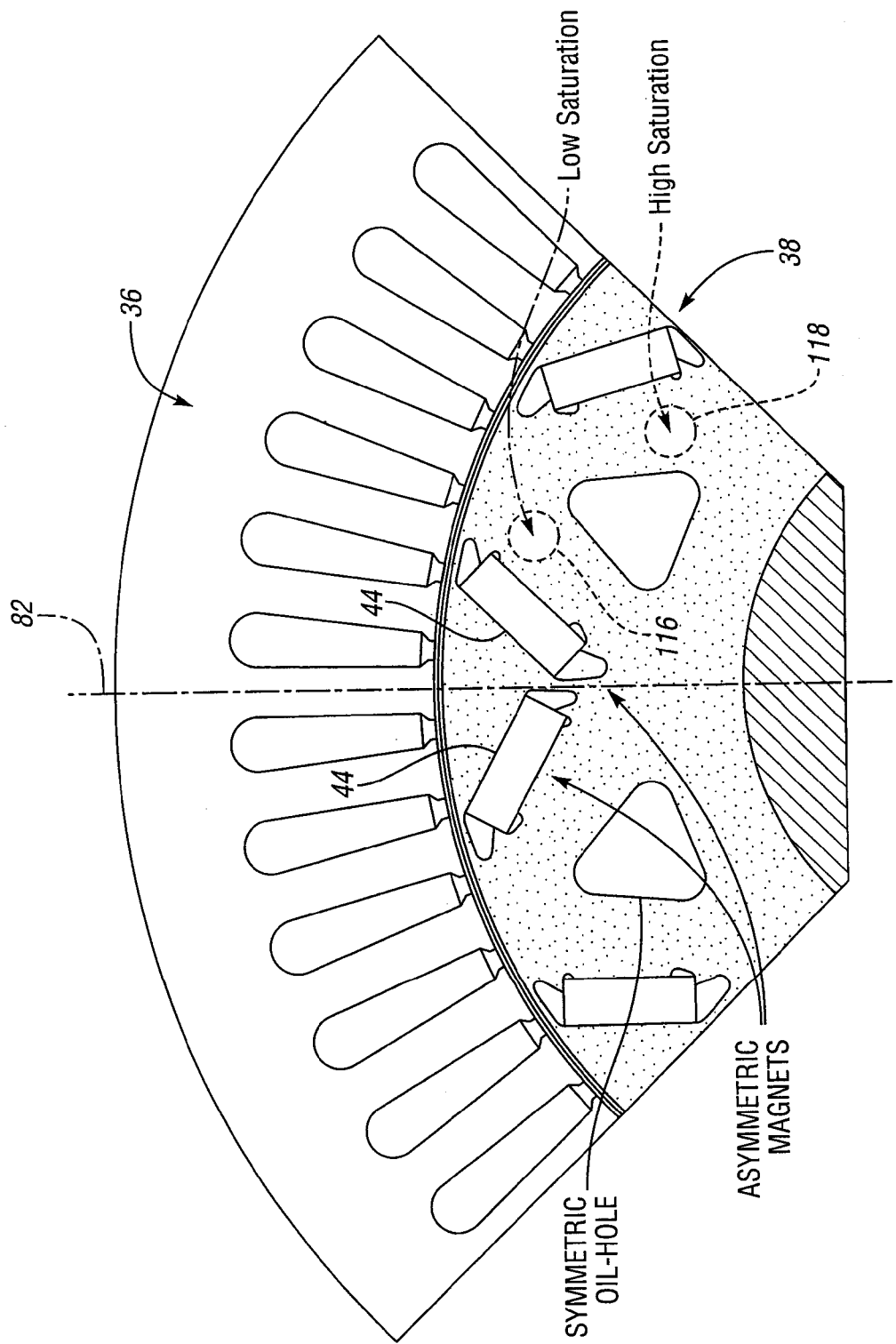
FIG. 10 is an embodiment of the invention, wherein the magnets, rather than the oil holes, are situated asymmetrically with respect to an axis of symmetry.

In the case of the design of FIG. 10, a desirable flux density distribution for an asymmetric rotor structure can be achieved also by placing the permanent magnets asymmetrically with respect to axis 82 as indicated, rather than by placing the oil holes asymmetrically with respect to the axis of symmetry 82. When the magnets are positioned, as shown in FIG. 10, a low saturation area is developed at region 116 and a high saturation area is developed at 118. Again, this will improve electromagnetic performance during motoring and degrade electromagnetic performance during operation in the generating mode. The degradation in performance during generating, however, is less than the improvement in electromagnetic performance during motoring, as previously explained.

In addition to the oil holes, or openings, previously described, the rotor structure may contain extra cavities located on a radially directed magnetic axe of each rotor pole, hereinafter referred to as the direct axis. The main purpose of these additional cavities is to increase the reluctance torque produced by a difference in the permeance seen along the direct axis and a quadrature axis extending radially and equidistant from adjacent pairs of magnets. This rotor structure is shown partially in FIG. 11, which illustrates the rotor assembled in a stator when no current exists in the stator. Flux flow lines are not shown. The stator construction shown in FIG. 11 may be the same as the stator construction shown in the previously described embodiments, so common reference numerals are used. The rotor structure of the embodiment of FIG. 11 is substantially different than the previously described rotor structures, so common reference numerals are not used.

In FIG. 11, a rotor structure is indicated at 122. Round openings 124 may be located in the rotor structure in concentric disposition with respect to direct axis 126. As in the case of the previously described embodiments, permanent magnets 128 and 130 are located near the air gap 40. The magnets are situated in openings corresponding to the magnet openings of the previously described embodiments. The magnets 128 and 130 are situated symmetrically with respect to a direct reference axis 126. The openings 124 are located on a quadrature reference axis 127.

In addition to the openings 124, the rotor structure of FIG. 11 has extra cavities or openings 132, which may be of generally triangular shape, located on direct axes 126 adjacent pairs of magnets 128 and 130.

The cavities 132 are situated adjacent the air gap 40. These extra cavities increase the torque produced by increasing the difference in the permeance created along a direct axis and a quadrature axis. This results in an increase in electromagnetic torque produced by the electric machine. An example of the use of symmetrically located extra cavities in an electric machine of this type may be seen by referring to U.S. Pat. Nos. 6,803,692 and 7,170,209.

Figure 12:
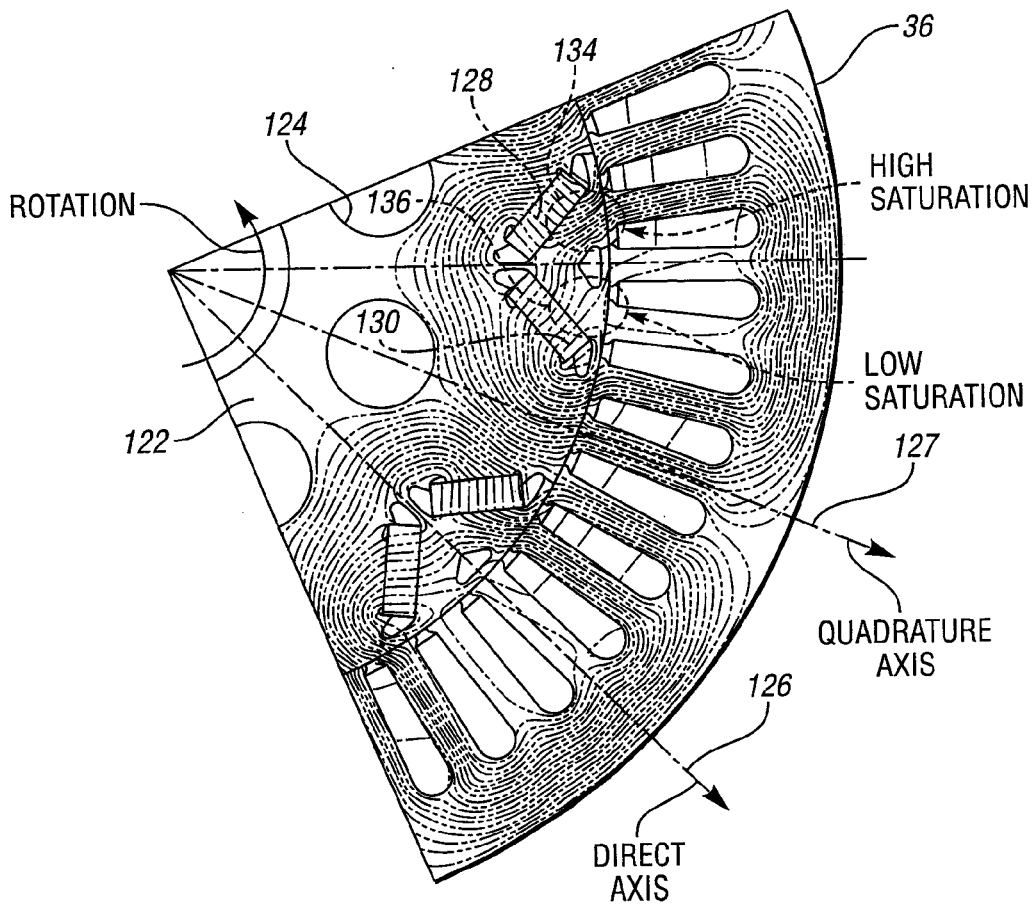
FIG. 12 is a view similar to the view of FIG. 11 showing magnetic flux flow lines during motoring operation when the extra cavities in the rotor are disposed symmetrically relative to an adjacent pair of magnets.

FIG. 12 shows a magnetic flux distribution that is created when the windings of the stator 122 are energized. The flux distribution created by the interaction of the flux flow lines of the magnets and the flux flow lines of the stator are indicated in FIG. 12. A high saturation area is created in the flux density distribution, as indicated at 134 in FIG. 12. Further, a low saturation area is created at 136. The high saturation area and the low saturation area are created by the interaction of the stator flux and the flux distribution for the magnets.

The flux flow path illustrated in FIG. 12 is created during motoring operation of the electric machine.

Figure 13:
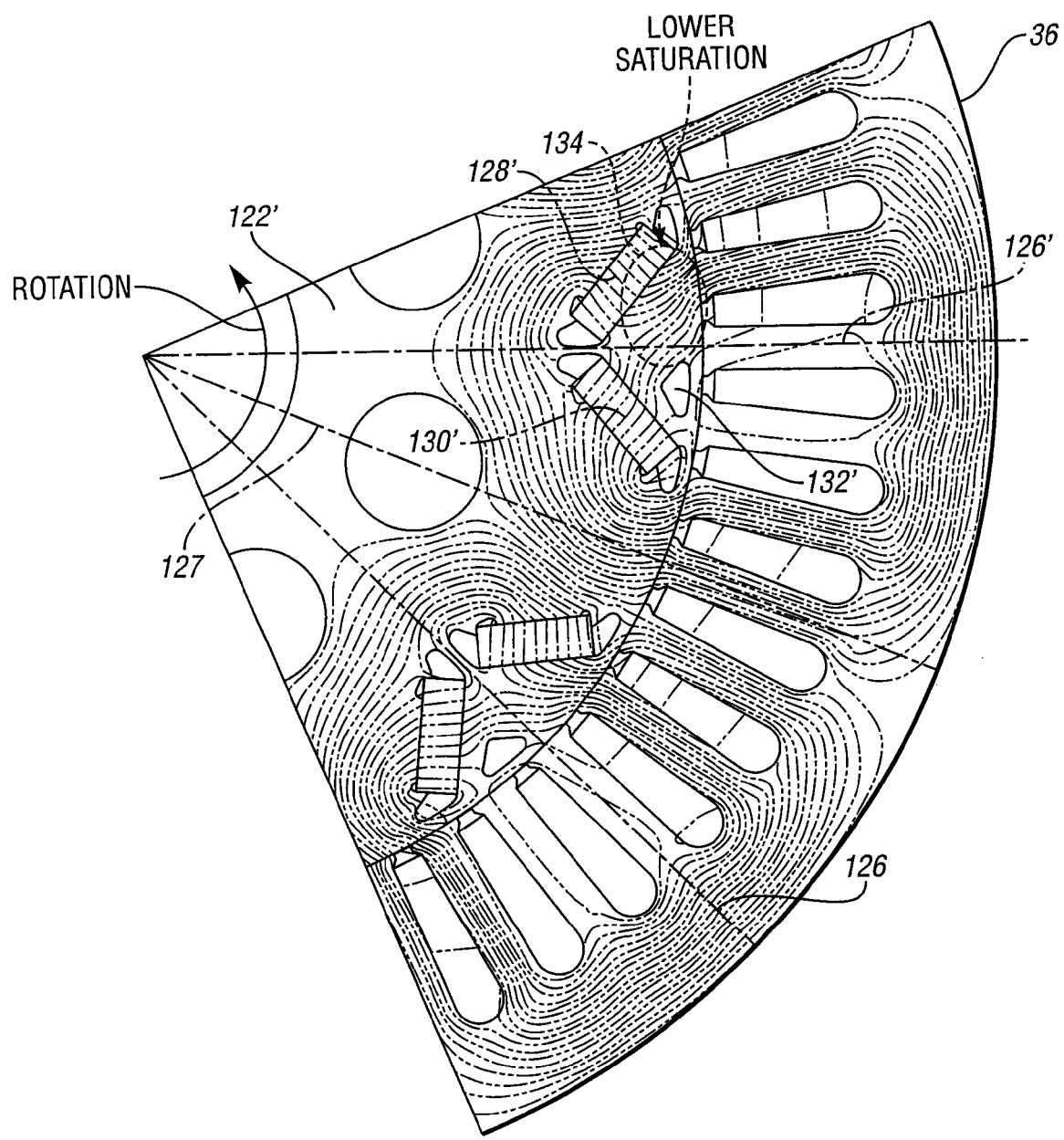
FIG. 13 is a view similar to the view of FIG. 12 showing magnetic flux flow lines during motoring operation when the extra cavities are disposed asymmetrically during motoring operation.

This flux flow path is illustrated for purposes of comparison with the flux flow path shown in FIG. 13 where the extra cavities are asymmetrically located.

FIG. 13 shows an embodiment of the invention that includes asymmetrically positioned extra cavities 132' located in rotor structure 122'. Each extra cavity 132' is offset relative to the direct axis 126'. This creates an asymmetric disposition of the extra openings 132' relative to pairs of magnets 128' and 130'. Because of this asymmetric disposition of the extra openings 132', a lower saturation area is developed at 134 during motoring operation.

A strategic location and geometry of the extra cavities is created by rotating the cavities or displacing them with respect to the magnetic axes of symmetry or the direct axis 126'. An additional advantage in the asymmetric disposition of the extra cavities is achieved in much the same way as displacing or rotating the oil holes to increase the output torque of the machine, as described previously with respect to FIGS. 5 and 8. In the case of the use of asymmetric extra cavities as shown in FIG. 13, the output torque and the power of the electric machine are increased. In general, a machine having both oil holes and extra cavities located asymmetrically with respect to the rotor poles will benefit from both contributions to increase the output torque.

In the case of the flux density illustrated in FIG. 12, the flux density distribution in the region between the permanent magnets and the extra cavity is asymmetric. Using the direction of rotation as a reference, the region in front of the leading edge of the cavity is more heavily saturated than the region in the lagging edge when the rotor is rotated in the direction of the rotation directional arrow illustrated in FIG. 12.

To reduce the average saturation level and to increase the output power of the motor, the available path for the magnetic flux flow in the heavily saturated region should be increased during motoring. This is achieved by displacing the extra cavity for each pair of magnets to the region with a lower flux density, as illustrated in FIG. 13.

Although embodiments of the invention have been disclosed, it will be apparent to persons skilled in the art that modifications may be made without departing from the scope of the invention. All such modifications and equivalents thereof are intended to be defined by the following claims.

What is claimed:

1. A permanent magnet machine comprising:
a rotor, a stator in close proximity to the rotor, and electrical windings in the stator;
the rotor being rotatable relative to the stator with an air gap between the stator and the rotor;
multiple pairs of magnets carried by the rotor in close proximity to the stator windings; and
at least one opening in the rotor adapted for accommodating flow of a cooling medium for weight reduction;
each opening being generally asymmetrically positioned with respect to pairs of adjacent magnets whereby a magnetic flux distribution developed by the magnets interacts with a magnetic flux distribution developed by the stator windings to effect a resultant flux distribution characterized by a reduced overall flux density in the rotor when the machine functions as a motor.

2. A permanent magnet machine comprising:
a rotor, a stator surrounding the rotor with an air gap between an outer periphery of the rotor and an inner periphery of the stator;
electrical windings in the stator;
multiple pairs of magnets in the rotor in close proximity to the stator windings; and
openings in the rotor adapted for accommodating flow of a cooling medium and for weight reduction, the openings being located between separate pairs of magnets;
one magnet of each pair of magnets being located closer to a portion of an opening in the rotor than a corresponding magnet of an adjacent pair of magnets thereby establishing an asymmetric rotor structure;
the magnets having an electromagnetic flux distribution for the magnets that interacts with an electromagnetic flux distribution for the stator windings to define a combined flux distribution pattern that envelops the pairs of magnets whereby the machine operates with a higher efficiency in a motoring mode and a reduced efficiency in a generating mode.

3. A permanent magnet machine comprising:
a rotor, a stator in close proximity to the rotor, and electrical stator windings in the stator;
the rotor being drivably connected to a rotor shaft and rotatable relative to the stator with an air gap between the stator and the rotor;
multiple pairs of magnets embedded in the rotor in close proximity to the stator windings;
openings of generally triangular shape positioned generally asymmetrically in the rotor relative to adjacent magnets for accommodating flow of a cooling medium and for weight reduction;
the stator windings and the magnets having flux distributions that interact with each other to establish a combined flux flow path between each opening and an adjacent magnet of each pair of magnets whereby the generally triangular shape of the openings makes possible a reduced average electromagnetic flux saturation per unit rotor length at regions in the flux flow path for the rotor between one of each pair of magnets and the openings during a motoring mode.

4. The permanent magnet machine set forth in claim 3 wherein the openings are asymmetric with respect to adjacent pairs of magnets whereby electromagnetic flux density at regions of the rotor between the openings and the magnets is optimized for improved efficiency when the machine is in a motoring operating mode.

5. The permanent magnet machine set forth in claim 3 wherein multiple adjacent pairs of magnets are generally symmetrically disposed with respect to a line of symmetry extending through a geometric center of the opening and the openings are asymmetrically disposed with respect to the line of symmetry;
an apex of the generally triangular opening being displaced from the line of symmetry whereby effective flux saturation in the flux-flow path between the opening and an adjacent magnet is optimized for improved efficiency when the machine is in a motoring operating mode.

6. The permanent magnet machine set forth in claim 3 wherein multiple adjacent pairs of magnets are symmetrically disposed with respect to a radial line of symmetry for each pair;
the openings being asymmetrically disposed relative to the line of symmetry to establish electrical flux flow path around the openings that is of reduced density on one side of the openings thereby improving efficiency when the machine functions as a motor.

7. The permanent magnet machine set forth in claim 3 wherein multiple adjacent pairs of magnets are generally symmetrically disposed with respect to a radial line of symmetry;
the openings being asymmetrically displaced from the line of symmetry thereby establishing a flux flow distribution of optimum flux density in regions of the rotor between the openings and adjacent magnets during operation of the machine in a motoring mode.

8. The permanent magnet machine set forth in claim 3 wherein pairs of the magnets are positioned asymmetrically with respect to a radial line of symmetry extending between the magnets of the pairs whereby flux density in regions of the rotor between the openings and the magnets is optimized for improved efficiency during operation of the machine in a motoring mode.

9. A permanent magnet electric machine comprising:
a rotor, a stator in close proximity to the rotor, and electrical windings in the stator;
the rotor being rotatable relative to the stator with an air gap between the stator and the rotor;
multiple pairs of magnets carried by the rotor in close proximity to the stator windings; and
at least one opening in the rotor, the opening being located adjacent one magnet of at least one of the pairs of magnets and defining a spacing therebetween to accommodate flux flow therethrough, the spacing having a high density region and a low density region;
the opening being asymmetrically positioned with respect to a pair of magnets whereby a magnetic flux developed by the magnets interacts with the magnetic flux produced by the stator windings to effect a resultant flux distribution characterized by a reduced overall flux saturation in the rotor when the machine functions as a motor, the asymmetric positioning increasing flux density in the low density region and reducing flux density in the high density region whereby an overall flux density in the spacing is reduced during operation of the electric machine in a motoring mode.

10. A permanent magnet machine comprising:
a rotor, a stator surrounding the rotor with an air gap between an outer periphery of the rotor and an inner periphery of the stator;
electrical windings in the stator;
multiple magnets in the rotor in close proximity to the stator windings; and
openings in the rotor, the openings being located between separate pairs of magnets and spaced therefrom to define flux flow paths therebetween;
one magnet adjacent each pair of magnets having a spacing from a side of an adjacent rotor opening to define a flux flow path with a high flux density region and a low flux density region;
the openings being asymmetrically positioned with respect to the pairs of magnets whereby spacing in the high flux density region is increased and spacing in the low flux density region is decreased when the permanent magnet machine acts as a motor, a reduction in operating efficiency due to an increase in flux density in the low density region during motoring is less than an increase in operating efficiency due to a decrease in flux density whereby overall operating efficiency is increased.

* * * * *